United States Patent
Gonzalez Mendez

(10) Patent No.: US 10,690,510 B2
(45) Date of Patent: Jun. 23, 2020

(54) MONITORING SYSTEM FOR ANTICIPATING DANGEROUS CONDITIONS DURING TRANSPORTATION OF A CARGO OVER LAND

(71) Applicant: Pedro Renato Gonzalez Mendez, Concepcion (CL)

(72) Inventor: Pedro Renato Gonzalez Mendez, Concepcion (CL)

(*) Notice: Subject to any disclaimer, the term of this patent is extended or adjusted under 35 U.S.C. 154(b) by 176 days.

(21) Appl. No.: 15/573,125

(22) PCT Filed: May 12, 2015

(86) PCT No.: PCT/CL2015/000034
§ 371 (c)(1),
(2) Date: Nov. 9, 2017

(87) PCT Pub. No.: WO2016/179715
PCT Pub. Date: Nov. 17, 2016

(65) Prior Publication Data
US 2018/0128640 A1    May 10, 2018

(51) Int. Cl.
*G01M 17/00* (2006.01)
*G01C 21/36* (2006.01)
(Continued)

(52) U.S. Cl.
CPC .......... *G01C 21/3697* (2013.01); *B60Q 9/00* (2013.01); *B60W 50/04* (2013.01); *B60W 50/06* (2013.01);
(Continued)

(58) Field of Classification Search
CPC .. G01C 21/3697; G01C 21/18; G01C 21/165; G07C 5/085; G07C 5/008; B60Q 9/00;
(Continued)

(56) References Cited

U.S. PATENT DOCUMENTS

| 4,974,166 A | 11/1990 | Maney et al. |
| 5,686,888 A | 11/1997 | Welles, II et al. |

(Continued)

FOREIGN PATENT DOCUMENTS

| AU | 2008219810 B2 | 9/2008 |
| CL | 46804 | 2/2005 |

(Continued)

OTHER PUBLICATIONS

Chilean Office Action for counterpart Chilean Application No. 2837-2017, dated May 17, 2019, with English translation, 14 pages.
(Continued)

*Primary Examiner* — Khoi H Tran
*Assistant Examiner* — B M M Hannan
(74) *Attorney, Agent, or Firm* — Cantor Colburn LLP

(57) ABSTRACT

A monitoring system for anticipating dangerous conditions during the transportation of a cargo over land detects and reports instability and the risk of tipping of a cargo. This is accomplished by measuring, registering and analyzing the physical dynamics of a cargo transported over land, by a vehicle, and by generating and displaying in the driver's cabin of the vehicle anticipatory alarms specific to conditions of risk of instability and of tipping associated with the route via which the vehicle is travelling. These alarms are displayed in the cabin of the vehicle itself so that the driver can perform actions to reduce the condition of risk. The system has a modular configuration so that it can be installed in any vehicle.

20 Claims, 3 Drawing Sheets

(51) Int. Cl.
*B60W 50/04* (2006.01)
*B60W 50/06* (2006.01)
*G08G 1/00* (2006.01)
*B60Q 9/00* (2006.01)
*G01C 21/16* (2006.01)
*G01C 21/18* (2006.01)
*G07C 5/08* (2006.01)
*G06F 16/29* (2019.01)
*B60R 11/02* (2006.01)
*G07C 5/00* (2006.01)

(52) U.S. Cl.
CPC .......... *G01C 21/165* (2013.01); *G01C 21/18* (2013.01); *G07C 5/085* (2013.01); *G08G 1/205* (2013.01); *B60R 11/0229* (2013.01); *G06F 16/29* (2019.01); *G07C 5/008* (2013.01)

(58) Field of Classification Search
CPC ..... B60Q 1/525; G06F 16/29; B60R 11/0229; B60R 1/12; B60R 1/00; B60R 2001/1215; G08G 1/205; B60W 50/06; B60W 50/04
USPC .................. 701/32, 9, 32.3–32.5, 32.7–32.8; 340/425.5
See application file for complete search history.

(56) References Cited

U.S. PATENT DOCUMENTS

| | | | |
|---|---|---|---|
| 7,133,661 | B2 | 11/2006 | Hatae et al. |
| 8,427,290 | B2* | 4/2013 | Davis ................... G08G 1/205 340/425.5 |
| 8,630,768 | B2 | 1/2014 | McClellan et al. |
| 2005/0125117 | A1* | 6/2005 | Breed ................... G07C 5/008 701/31.5 |
| 2006/0190124 | A1 | 8/2006 | Makela |
| 2007/0213923 | A1 | 9/2007 | Brynielsson |
| 2008/0077327 | A1* | 3/2008 | Harris .................. G01S 13/931 701/301 |
| 2008/0120201 | A1 | 5/2008 | Velazquez et al. |
| 2008/0140278 | A1* | 6/2008 | Breed ...................... G06F 8/65 701/31.4 |
| 2008/0215202 | A1* | 9/2008 | Breed ................ G01C 21/3611 701/25 |
| 2009/0045927 | A1 | 2/2009 | Atella |
| 2009/0062971 | A1 | 3/2009 | Rottig et al. |
| 2014/0207497 | A1 | 7/2014 | Collins et al. |
| 2014/0210644 | A1 | 7/2014 | Breed |
| 2015/0003208 | A1 | 1/2015 | Carmona et al. |
| 2015/0066349 | A1* | 3/2015 | Chan .................. G01C 21/3407 701/400 |
| 2015/0127212 | A1* | 5/2015 | Chacon ................ B60R 21/013 701/32.4 |
| 2015/0197248 | A1* | 7/2015 | Breed ................ G08G 1/09626 701/93 |

FOREIGN PATENT DOCUMENTS

| | | |
|---|---|---|
| CL | 200802501 | 10/2009 |
| CL | 201202466 | 8/2012 |
| CN | 101398484 A | 4/2009 |
| CN | 103871223 A | 6/2014 |
| JP | 2001310820 A | 11/2001 |
| JP | 2008041104 A | 2/2008 |
| JP | 2008164588 A | 7/2008 |
| WO | 2011141629 A1 | 11/2011 |

OTHER PUBLICATIONS

Exponor 2015, Selected card for program, launch your innovation [on-line], Apr. 2015 [retrieved on] Nov. 8, 2015] Retrieved from internet: <URL:http://www.exponor.cl/cms/wp-content/uploads/2015/04/Ficha-de-seleccionados-programa-Lanza-Tu-Innovaci%C3%B3n-%E2%80%93-EXPONOR-2015.pdf>, p. 4.
International Preliminary Report on Patentability PCT/CL2015/00034 dated Feb. 2, 2016, with Written Opinion in Spanish, 8 pages.
International Search Report for PCT/CL2015/000034 dated Nov. 4, 2015, 3 pages.
Written Opinion for PCT/CL2015/00034 dated Feb. 5, 2016, with English translation, 17 pages.

* cited by examiner

MONITORING SYSTEM FOR ANTICIPATING DANGEROUS CONDITIONS DURING TRANSPORTATION OF A CARGO OVER LAND

CROSS-REFERENCE TO RELATED APPLICATION

This application is a U.S. national stage application of International Application No. PCT/CL2015/000034, which has an international filing date of 12 May 2015.

BACKGROUND OF THE INVENTION

Field of Invention

The present invention relates to procedures and security provisions for land freight transport vehicles.

State of the Art

Freight transport is an important and vital economic activity for most productive and service activities around the world, characterized by its dynamism and increasing sophistication. In Chile, road transport has become the main transport mode, either because of the reduced development of other transport modes or because of the topographical characteristics of the territory.

The safety in all types of freight or cargo transport is not a minor issue when assessing the risks and costs involved in the transport of cargo and people transport, as well as the undeniable value of transport equipment itself.

For several years, the transport of hazardous freight has been acquiring special treatment due to the greater danger of an accident compared to vehicles transporting non-hazardous freight or cargo. This makes it essential that this type of transport requires a more specialized operation every day to maintain not only the people protection but also to avoid unwanted environmental impacts.

According to the current regulations, Supreme Decree No. 298/94 of the Ministry of Transport and Telecommunications, in Chile, a dangerous substance is defined as one that, due to its characteristics, represents a risk to human health, public safety and the environment. This category includes elements such as flammable gases and liquids, fuels and explosives, among others, inputs that are commonly used, particularly in mining activities.

Currently, to supervise land cargo transport, there are solutions based mainly on GPS (Global Positioning System) technology that allow estimating the position and cargo transport speed, both maritime and terrestrial. There are also variants that allow registering other types of information, obtained from the use of sensors installed in a vehicle that register events such as: door openings, fuel loading or other factors but mainly in the area of cargo transport. These are aimed at protecting the transport asset.

Other equipment used is the tachograph, which allows recording driving and rest times, engine revolutions per minute (RPM), idle times, travelled distance and sudden braking. Also used on controls which provide automatic alerts when a legal driving period (5 hours) have ended. However, this information is extracted as a register for later review and is aimed at complying with the maximum speed and maximum driving time regulations.

Another system available is the RSS or Rollover Stability Support which, based on wheel speed and lateral acceleration measuring, autonomously applies the brakes for the driver when a possible rollover situation is detected. This system, however, does not take into account the specific conditions of the load or the journey and may even be limiting or dangerous in maneuvers in which the driver requires not applying the brakes.

Satellite tracking systems and safety devices also have been implemented which are already incorporated in the new trucks, such as AWS (driver alert system), cable shielding, alcolock, 'blind spot' vehicle detector, ABS-EBS (anti-slip) braking system, among others, which are very important for vehicle safety within the road standard, where the main objective is to reduce the accident possibility. However, the best operation, awareness raising, better training and more assistance to those who drive these vehicles is still very relevant.

Technological advances in this area have led to obtaining of equipment with 'third eye' devices, safety seat belts with alarm, fatigue sensors and even fleet monitoring where speed is restricted through electronic programming. The fleet control system is also incorporated by means of the use of global hybrid positioning tools, which means that when there is no coverage of the cellular system, used to transmit the data obtained from the GPS, for the geographic area in which it is being transiting, it is instantaneously activated with the satellite signal.

Such equipment and methods allow a remote user to evaluate the driving behaviour of drivers as a means of safety-oriented control. However, the problem still persists due to the lack of knowledge of the actual way in which the load behaves physically during the journey; there is not yet a system that allows for a scientific evaluation of the transported load path.

Current land freight transport monitoring systems only estimate position and speed information of the driver's cab but do not actually monitor dynamic load conditions during the route. This is particularly important in semi-trailer and trailer-type trucks where dynamics-physics load may be significantly different from that which occurs in the cab or tractor; and it is even more critical in the transport of liquid, viscous, gel, or grain cargos whose dynamics affect and even determine the dynamics-physics which affect the safety of truck-charging set driving.

Empirical experience indicates that, due to the ignorance of this dynamic-physical load on the part of drivers and/or other participants in the transport service operation, the human factor remains the main cause in the occurrence of traffic accidents. When an accident occurs involving one of these dangerous goods vehicles, the effects can be devastating on human lives, third-party vehicles, road infrastructure and also on the surrounding environment, whether it occurs on a public road or within an industrial site.

It is for this reason that it is of great significance to propose and apply a technology that is capable of evaluating the dynamic-physical load and from this generate valuable information for decision making and actions in a better way than the means currently available, thus helping the personnel involved with the operation of the service as a whole, such as drivers, mechanics, dispatchers, security officers and their management, both in the transport of hazardous and non-hazardous products, passengers and all cargo in general.

In relation to the state of industrial property, the following documents related to the technology material of this application were found.

The US20150003208 patent application refers to a method to instrumentalize a container that is destined to receive an assortment of materials, and a monitoring system, capable of providing movements established through a preestablished coordinate system, which consists of the following steps: placing at least one communication element in the container or on the internal surface of the container, a time tracking system for each communication element in the preestablished coordinates system. On the other hand, US20070213923 patent application disclose a method for communication between a vehicle travelling along a route and a stationary system. The vehicle is equipped with a unit to communicate messages to the stationary system, where this method includes: dividing the route into multiple partial sections, define the flow of information from the vehicle for each partial section, adapting the communication and messages sending, in relation to changes of time and according to certain fixed points along the route.

The worldwide WO2011141629 patent application, relates to a method for a mining vehicle safety system. This method involves scanning the surroundings of the mining vehicle while driving and provides collision warnings if obstacles are detected in the area. It includes a system for stopping the vehicle in risk situations.

The Japanese JP2008164588 patent application provides a method to monitor a container by means of an impact detector through the detection of rotation angle and force equivalent to gravitational acceleration of the container tracking system. The method includes the collection container of multiple forces submitting, using an electronic detection device, and the storage of such information in the electronic detection device, as well as tracking data. Based on this tracking data it can be determined whether the container is exposed to excessive force by default. Similar proposal is the Japanese JP2008041104 patent application which provides a method of monitoring condition and integrity of goods during shipment, using a local area network.

The JP20011310820 patent application of the Japanese Patent Office refers to a monitoring system article, which corresponds to a transportation and storage system. This system comprises an integrated semiconductor circuit, where several batches are processed simultaneously in a suitable circuit. Each batch is related to a different container movement. And the Chinese CN101398484 application disclose a method for tracking mobile objects such as containers via satellite. Allows to obtain tracking and positioning data. The method is characterized by the fact that it involves a radio frequency electronic card reader and a container mobile terminal. The mobile terminal consists of several modules: an automatic collection of the container number, load number, customer information, and others. All the modules functions are connected to a database.

Vehicle motion monitoring systems and methods, including map data and hazard prevention, are known at various levels in the art. Another US U.S. Pat. No. 7,133,661 patent disclose a notification system for the status of a moving object and detects object positioning information and transmits state and location data via a radio link whenever a collision is detected, from which a wide range of commercial applications are derived, all of which maintain the above-mentioned kinematic limitation.

The Chilean CL200400622 application disclose a method to prevent a mining vehicle from colliding by determining a safe sidewall area, an obstacle-free route from data obtained from scanning the vehicle environment and forming memory points on the basis of points that restrict the route, this method also does not address the dynamic aspects of the vehicle, but rather performs kinematic processing and visualization of nearby obstacles and it is restricted to vehicles operating within a mine site. Another Chilean CL200802501 application disclose a mining environment navigation and hazard prevention system and method that includes a core application, means for defining a dynamic road map, a remote application for exchanging data with at least one remote computer, means of register and tracking, and a radio transceiver. Finally, the Chilean CL201202466 Patent Office's application disclose a method for determining a real-time circulation route in a public transport vehicle and delivering multimedia information to users according to the chosen route and does not take into account the physical dynamics of the vehicle and its load, but rather focuses on the kinematic aspects.

None of the documents found consider the integrated parameters used in this proposal, none of these documents reproduce either partially or totally the proposed technology.

DETAILED DESCRIPTION OF THE INVENTION

Figure 1:
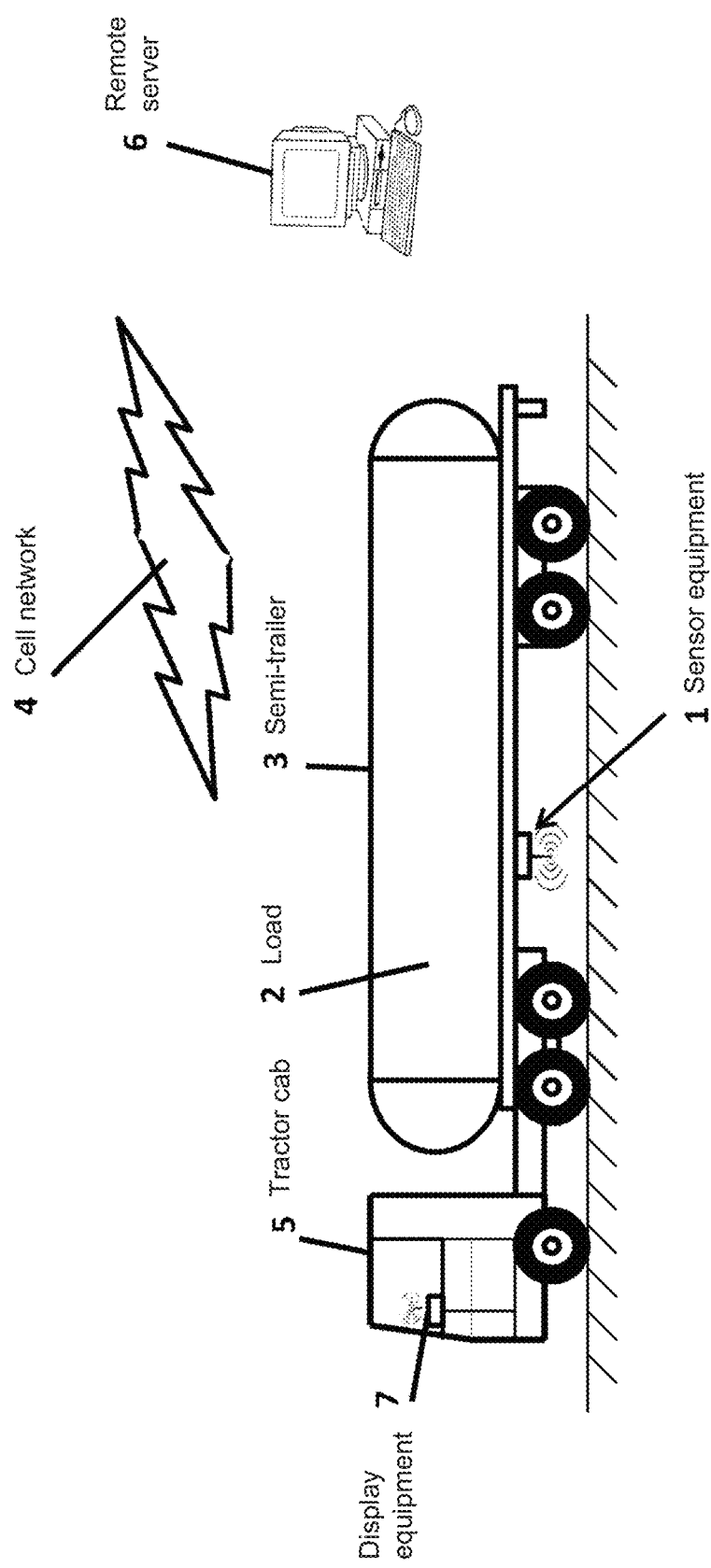
FIG. 1 is a schematic view of an embodiment of the system of the present invention.

As shown in FIG. 1, sensor equipment 1 is attached to the trailer or semi-trailer 3 (sometimes referred to below as container 3) of a vehicle's load and during its movement, it registers the physical path of the route with different measurements. Sensor equipment 1 is equipped with data transmission means through cell network 4 and, when it registers a predetermined combination of parameters, it generates a preventive alarm that transmits to a receiver forming part of display equipment 7, which in turn emits audible and visual signals for the driver to receive them inside tractor cab 5 and/or to a remote server 6.

Figure 2:
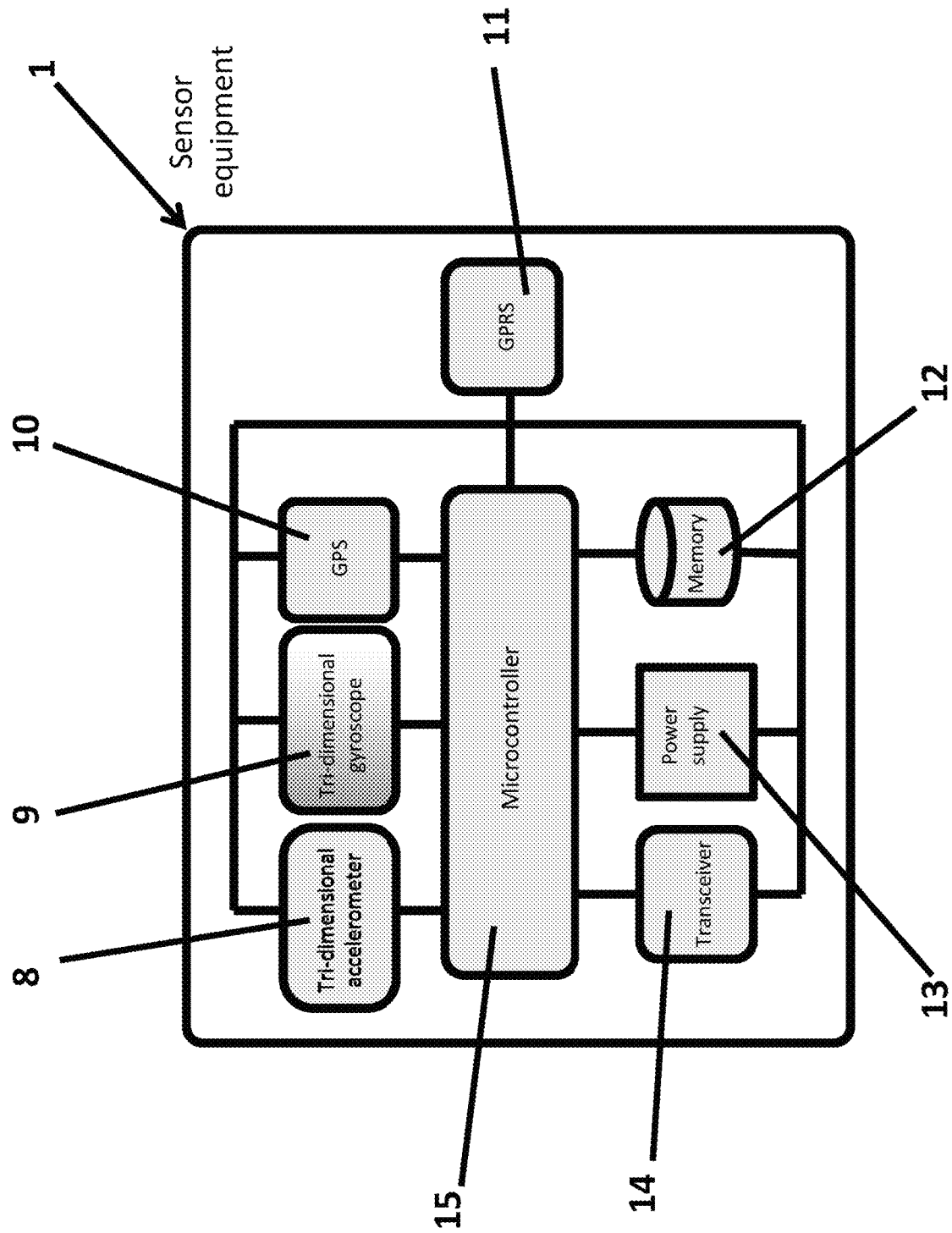
FIG. 2 is a schematic diagram of one embodiment of sensor equipment shown at 1 in FIG. 1.

With reference to FIG. 2, sensor equipment 1 is designed to register and transmit load signals and alarm data. Sensor equipment 1 comprises a compact electronic instrument that is installed attached to the trailer or semi-trailer. It comprises a tri-dimensional accelerometer 8, tri-dimensional gyroscope 9 and GPS module 10 all connected to a microcontroller 15, which receives and processes the 3D acceleration, 3D orientation, georeferenced position and estimated velocity information. Sensor equipment 1, also includes a memory module 12 where the data obtained from sensors 8, 9 and 10 are stored. Sensor equipment 1 also includes a GPRS (General Packet Radio Service) module 11, that allows it to send and receive data to a remote server 6, through a cellular network 4; it has a radio transceiver module 14, that allows it to transmit alarm data to the display equipment 7. Sensor equipment 1 has an internal backup power supply unit 13.

Figure 3:
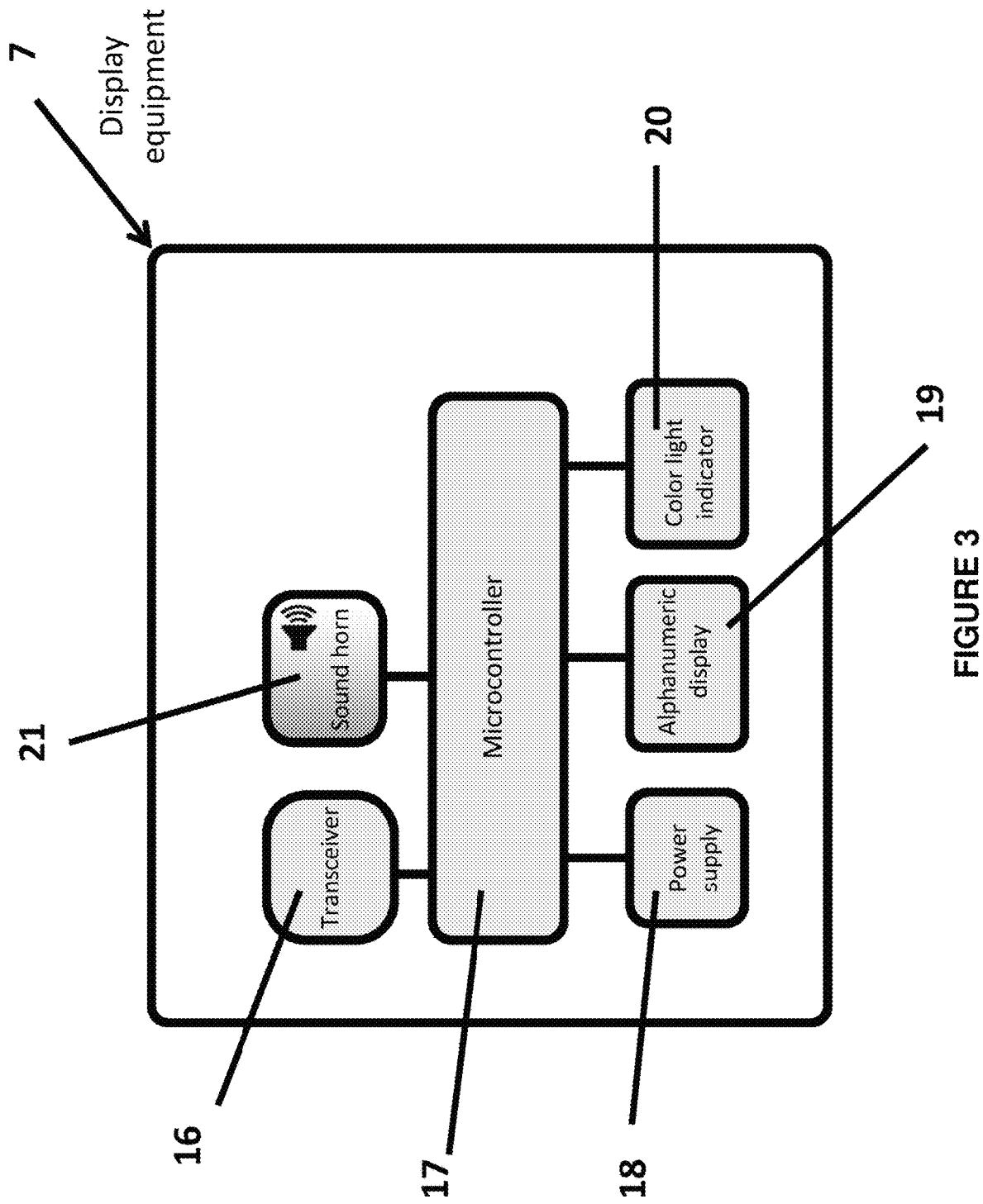
FIG. 3 is a schematic diagram of display equipment in accordance with one embodiment of the present invention.

FIG. 3 diagrammatically shows display equipment 7, which is designed to emit alarms in the driver's cab based on data received from the sensor equipment 1, installed in the trailer or semi-trailer 3.

The display equipment 7 is installed inside of the truck or tractor cab 5, as appropriate and its function is to receive information from the sensor equipment 1, and issue alarms to the driver. It has a sound horn 21, which emits a sound signal when it receives an alarm signal from the sensor equipment 1, a radio transceiver 16 that allows data to be received from the sensor equipment 1, a second microcontroller 17, that processes the information received from the sensor equipment 1, a power supply unit 18, an alphanumeric display 19 that allows time to be displayed, measured in seconds, before a risk of instability situation is reported from the instrument.

In order to solve the above-mentioned disadvantages of the prior art and achieve the objectives of monitoring, measuring, data processing and generating valuable information for taking of actions that prevent accidents caused by tipping, sliding or poorly braking in freight transport vehicles by land, the present invention discloses a system that performs the monitoring of the dynamic-physical condition of a land transported load and that allows anticipating dangerous conditions during its trajectory.

This invention comprises a device and a method that constitute the monitoring system. The apparatus consists of sensor equipment 1, which is fitted with means of attachment to trailer or semi-trailer 3 and which, when attached to the trailer or semi-trailer 3, measures and records the trajectory of a load or cargo 2 transported by land using information obtained from its acceleration sensors, i.e., tri-dimensional accelerometer 8, orientation from its tri-dimensional gyroscope 9, speed from its GPRS 11 and geographical position from GPS 10, and comprises a display equipment 7, which is fitted with means of attachment to the truck cab 5 and which receives alarm information from sensor equipment 1 and it is displayed to the driver.

The invention also includes a method of obtaining, register, processing, displaying and transmitting the information, obtained by the sensor equipment 1, that allows evaluating the physical conditions of load 2 during displacement; it also allows the driver to be alerted by alarms of the proximity of risk conditions of instability during a journey; and it also allows feeding and maintenance of a database residing on a server 6, with information on points and areas at risk of instability for each trailer or semi-trailer combination.

The monitoring system of the present invention provides for obtaining, registering, processing, displaying and transmitting information and, for a specific route, enables one to determine and geographically locate risk factors, in advance of given displacement points and areas of risk of instability. These factors are determined for each type of trailer or semi-trailer 3 according to their physical conditions such as, but not limited to: weight, tare, type of load 2 (FIG. 1), shape, dimensions and filling percentage. The information on points and at risk of instability areas is georeferenced and is updated each time the sensor equipment 1, installed in the container 3, is displaced along the same route again, thus generating a continuous update of the information. This and other system operation information is stored and processed on the server 6.

The scope of this technology is quite wide since its use is suitable for cargo vehicles, both hazardous and non-hazardous, as well as for the transport of passengers travelling on public or private roads; in addition, the characteristics of the invention can be applied to other types of land transport.

The sensor equipment 1, contains at least: a tri-dimensional accelerometer 8, a tri-dimensional gyroscope 9, a GPS module 10, a GPRS (General Packet Radio Service) module 11, a memory module 12, a power supply unit 13, a microcontroller 15 and a radio transceiver 14, which together enable the measurement, storage, processing and transmission of location, acceleration, orientation and speed information for the container 3, where the device is installed.

The display equipment 7, comprises at least: a sound horn 21, a radio transceiver 16, a second microcontroller 17, a power supply 18, an alphanumeric display 19, a color light indicator 20 and fixing means.

The system operation is initiated when the sensor equipment 1, is installed in a structural area of the truck's compartment 3, so that the dynamics measured are representative of the corresponding dynamics in the load. Before the first measurement is made, parameters of the trailer or semi-trailer 3 and its contents are introduced into the sensor equipment 1, such as, but not limited to: patent plate, tare, dimensions, trailer or semi-trailer format and type of load it contains. In addition, the sensor equipment also contains data specific to the route and the load to be transported in this first movement, such as, but not limited to: origin, destination, load layout, weight and filling percentage. With this data, the sensor equipment 1, establishes specific parameters of the load to be monitored in this first trip that synthesize its dynamics such as, but not limited to: weight, gravity center and inertia moments.

During the first travel displacement along a given route, the sensor equipment 1, installed on trailer or semi-trailer 3, measures and registers the three-dimensional acceleration, orientation, velocity and georeferenced position of the load, and at the end of the route, the registered information is extracted from sensor equipment 1, and entered and processed on remote server 6, using software developed specifically for this technology. The information thus obtained after processing on server 6, allows to generate for this combination of load 2, trailer or semi-trailer 3 and route, information on points and/or geo-referenced areas where any of the following conditions were recorded: risk of lateral tipping, risk of lateral slippage, excessive or prolonged braking, excessive frontal acceleration, vibrations over a certain threshold, maximum road speed exceeding. It also allows an animated representation of the load dynamics during the entire route, including but not limited to: geo-referenced position, geo-referenced speed, tri-dimensional orientation, tri-dimensional acceleration of the load, acceleration evolution measured in the trailer or semi-trailer during the route and the force applied to the different zones of the load container 3.

This resulting summary information on points and risk areas is transmitted from server 6 to sensor equipment 1 via cellular network 4, so that it can be used by sensor equipment 1, in future movements along the same path.

Each new set of data generated on the same sensor equipment 1, in new routes displacements is extracted from it and entered in server 6, which in turn processes them and generates the corresponding new set of risk points, which is also transmitted to the sensor equipment 1, thus storing the corresponding new points for each additional route where it has already been displaced.

This information on points and risk areas is also stored in server 6, and feeds a database that manages this and all other information related to the operation of the invention.

Prior to the next movement of both trailer 3-sensor equipment 1, the respective origin, destination, load weight and filling percentage data are entered in server 6 and if these correspond to parameters of any of the measurements already registered, with the information of risk points already received from server 6, the firmware of microcontroller 15, selects the set of points stored in memory 12 that correspond to the current route and uses them during the displacement to be able to generate and transmit information of anticipatory alarms to the display equipment 7, based on the sensors measurements and of an algorithm included in its firmware developed specifically for this system.

For this purpose, the display equipment 7, is installed in cab 5 of the truck or tractor and is arranged in a visible and safe place for the driver and the driving process. When the display equipment 7 receives alarm information from sensor equipment 1, the driver is informed of the risk condition in the form of an audible alarm and according to the implementation, as a visual information shown on a three-colour light display 20, where in a typical green implementation it corresponds to the normal condition, yellow is a low risk condition and red is a high risk condition; on the other hand, another display 19 will indicate, in seconds, how long the estimated time for the indicated condition to occur will be displayed. With these indications, the driver can make appropriate decisions and carry out the required driving operation to lower or eliminate the possibility of risk condition, depending on each situation.

All the information, such as the occurrence of alarms or other pertinent novelties, will be recorded within the memory 12 of sensor equipment 1 and according to the implementation will be transmitted to server 6 which in turn processes and transmits them via the internet to a web server so that it can be accessed by authorized remote users.

In each new movement on a new route, which is made by both trailer or semi-trailer 3 and sensor equipment 1 attached to trailer or semi-trailer 3, new points and risk areas are obtained as indicated above, which are stored in the database of server 6 with the information corresponding to the last measurements made and transmitted to the sensor equipment 1, so that it can use them in the future displacement as appropriate.

Since the trailer or semi-trailer 3, can be towed by different tractors in successive movements, it is necessary in each case that the tractor has the display equipment 7 in its cab 5.

When data from a new movement on a route that has already been registered, i.e., with the same origin and destination pair, is fed or entered on the server 6 and any of the weight, filling percentage or other relevant data is different from that of a previous record for the same route, the specific software of server 6, processes the information and generates a new set of risk data as disclosed above but associated with different weight values or filling percentage as appropriate. This new set of points and risk areas is transmitted to the sensor 1 equipment so that it can generate the corresponding alarms on the route. In this way the alarms can be adapted to the different container 3 loading conditions. This determines that multiple risk datasets will be generated for a particular route based on different weight parameters or percentage of fill or other relevant parameters; these resultant data will be transmitted to the respective equipment 1, for use in future movements and will also be stored on server 6 for further processing as required or necessary.

When both trailer or semi-trailer 3 and attached sensor equipment 1, are moved on a new route, the process of obtaining the respective areas and points above mentioned will be repeated in order to establish the risk parameters on this first route. Afterwards, the reading data from the sensor equipment 1, is extracted, entered, processed and stored on server 6, which then transmits it to sensor equipment 1 so that it can be used in the new path.

The main novelty of the invention lies in the fact that the sensor operation 1 and display equipment 7, in conjunction with the method of obtaining, recording, processing and transmitting the information allows the generation of specific risk information in advance for each type of cargo 2, container 3 and route based on measurements made on the same cargo 2.

It is also considered novel that the method of obtaining, registering, processing and transmitting the information allows to obtain relevant data that keep updated the risk information for each route and type of load 2, providing increasing precision to the users and in this way contributes to reduce the probability of accidents on the routes and vehicles where measurements have already been made.

It is another novelty of the invention that the information processed and stored in server 6, can be delivered to the users in such a way that it provides objective elements for the making of operational, economic or other decisions to reduce the occurrence of accidents or risk operations. In particular, the information obtained from the operation of this system can provide a vital content input for the training of truck drivers given the relevance of the human factor in the occurrence of accidents.

By implementing the invention, it is possible to determine the georeferenced location of a point or zone on a route where a cargo transported in a specific container 3, should not exceed a certain speed that may be even less than the maximum allowed road speed. In this way, in a later movement along the same route, the system will generate a warning alarm to the driver, warning him that he must slow down the speed because he is approaching a risk point of lateral overturning.

This invention constitutes a substantial change in the way of approaching the administration problems, supervision and control of the loads transported, since instead of estimating values and recording static or only kinematic data in the driver's cabin, it systematically measures and records the physical-dynamic in the load itself. This is because the sensor equipment 1, it is located in the cargo container 3, therefore it is dynamically in solidarity with its movement, the forces applied to it and its physical trajectory.

Another novelty of the invention with respect to what already exists in the state of the art, is that it considers the particular georeferenced dynamics-physics but of the load, not of the truck-load assembly and it does so through the obtaining, recording and processing of the physical dimensions of the cargo container 3, the transported physical characteristics, the measurements in situ of acceleration, orientation, velocity and the georeferenced position during the whole journey.

A firmware operating in microcontroller 15 that synthesizes a mathematical model developed for this purpose is also a novelty of the invention.

A specific application of this system is in trucks transporting hazardous substances in liquid or gel form where the movements, vibrations and forces that interact on the load can affect their stability and safety as well as that of other vehicles and the surrounding environment. Even if the driving is carried out in compliance with road regulations, the mere occurrence of a very abrupt turning maneuver, even at the maximum permitted road speed may cause irreversible destabilisation with the result of rollover and accident.

APPLICATION EXAMPLES

Example No. 1: Detailed Description of an Invention Application

First, the sensor equipment 1, is installed in a safe location on the trailer 3 chassis. In the sensor equipment 1, data from trailer 3 such as, but not limited to: license plate, format, dimensions, tare weight and type of load are entered. This information is permanently stored in memory 12, of the sensor equipment 1, and is associated with both the semi-trailer 3 and sensor equipment 1.

Second, the sensor equipment 1, is fed with particular data of the load to be transported on this first route (trip), such as, but not limited to: origin, destination, weight, filling percentage, density and type of load.

The truck-load assembly performs the first route (trip) and throughout the entire journey the sensor equipment 1, measures and records acceleration, orientation, velocity and georeferenced position as above disclosed.

Once the first path is completed, the registered data is read from memory 12 and entered into server 6 which, using specific software, determines georeferenced stability risk zones and points as indicated above. This information is processed and transmitted via cellular network 4 or other available means from server 6 to the same sensor equipment 1, to be used in future trips on the same route.

From there onwards, each time a new movement of container 3 is made, the user fed (enters) via web to server 6 the data of: origin, destination, type of load, weight and filling percentage; server 6 processes them and if they correspond to the data entered in a previous measurement determines that sensor equipment 1 will operate in Supervised Mode and sends them via cellular network 4 or other available means to sensor equipment 1.

If, on the other hand, the source or destination data entered in server 6 do not correspond to previously registered data, then it will send sensor equipment 1 through cellular network 4, a message indicating that it will operate in Measuring Mode which corresponds to operate in the same way as the first time above disclosed.

Supervised Mode Condition.

Sensor equipment 1 uses the information received from server 6 and selects in its memory 12, the points and other corresponding parameters and sends a message via cellular network 4, to server 6, indicating that it is operating in Supervised Mode. It also sends from transceiver 14, to transceiver 16, pertinent data to the display equipment 7, equipment informing that it is operated in supervised mode; the display equipment 7, will indicate this condition with a message according to its display 19. In this condition, the firmware of microcontroller 15 continuously evaluates the measurements of all sensors and uses the previously registered risk parameters to process them and generates low, medium and high danger alarms as appropriate. Medium and high danger alarms are transmitted to display equipment 7, using transceivers 14 and 16, and are processed by second microcontroller 17, to generate audible and visual alarms so that the driver can use them to act when necessary. High danger alarms are also transmitted to server 6.

However, if during the trip the firmware of microcontroller 15, based on the data received from the GPS module 10, detects that it has left the registered path corresponding to the origin-destination pair entered for this route, then it will go to the Measurement Mode Condition explained below.

Measurement Condition Mode.

If the source or target data entered on server 6, prior to a displacement is different from any previously registered for sensor equipment 1 or the firmware based on the data from the GPS module 10, detects that it has left the path that started as already registered, the sensor equipment 1 will go to the Measurement Condition Mode and will register the variables as it does when it is the first time it is circulating on a particular route. This condition will be transmitted to both server 6 and display equipment 7, and will be registered in memory 12, as a significant event.

If a sensor equipment 1, is going to make a displacement on a route already registered but the data such as load type, filling percentage or other changes in the container 3, the server 6, software processes the information and generates a new set of data associated with the route and transmits it to sensor equipment 1, before starting the trajectory. This is also registered as an event on server 6.

The software operating on server 6 receives, transmits, stores, processes, updates and manages all the information of each measured route, sensor equipment 1, container 3, display equipment 7 and any other pertinent information in order to have the necessary data for sensor equipment 1 and users at all times. In that way it can also generate reports based on the managed information.

Sensor equipment 1, when operating on a moving container 3, can send summarized information to server 6 via cellular network 4 or other available means, as required. The information collected by the server 6, can be processed and uploaded to a website so that authorized users can access it as required.

According to a typical implementation at the end of the displacement of tractor cab 5 and semi-trailer 3 with load 2, the information registered by the sensor equipment 1 is extracted by means of an in-person connection or other available means to a portable computer and from there it is transmitted to server 6, so that the central application stores, processes, transmits and allows its analysis, representation and later visualization.

A description of the typical system operation shown in FIG. 4 follows.

The software that operates on server 6, based on the information received from all the sensor equipment 1, operating in the system, allows you to generate and manage routes, container types, cargoes, drivers, danger points or areas, and driving directions database. You can receive and store summarized information in real time from sensor equipment 1, and process and transmit it to the website, which in turn deploys it properly so that authorized remote users can make relevant decisions.

Example No. 2: Land Test with Dangerous Loading

A specific application of this system was to first identify a semi-trailer where to install the sensor equipment 1, then registers the data of: patent plate, type of load. On server 6, data were entered for: license plate, trailer type, trailer tare, load type, load weight, rear axle width, tank height and width, tank gravity centre height and filling percentage. These data are summarized in Table No. 1.

TABLE NO. 1

Semi-trailer data.
Semi-trailer Data and Load

| Item | Value |
| --- | --- |
| Plate | JC-14-67 |
| Type | Three Axle Semi Trailer |
| Tare | 8.9 Tons (metric tons) |
| Load Type | Caustic Soda |
| Load Weight | 26 Tons (metric tons) |
| Shaft Ext. Distance | 2.4 m |
| Tank Height | 1.6 m |
| Tank Width | 1.6 m |
| Tank G.C. Height | 2.2 m |
| Filling Percentage | 90% |

The sensor equipment 1, was installed, attached to the structure of semi-trailer 3, at its lower rear. The equipment was connected to the semi-trailer 3 lighting circuit and operation tests were carried out on sensor equipment 1. During the 3-week period in semi-trailer 3, several trips were made and recorded according to Table No. 2.

TABLE NO. 2

| Measuring Data | |
|---|---|
| Item | Value |
| Start Date | 27 Nov. 2014 |
| Start Time | 11:38:49 |
| End Date | 28 Nov. 2014 |
| End Time | 5:07:46 |
| Geogr. Coord. Origin | −36.7933-73.0693 |
| Geogr. Coord. Target | −34.1619-71.3925 |

After the above-mentioned journeys, the semi-trailer 3, was inspected in the parking lot and the information regarding the journeys made was downloaded.

The information retrieved was processed on server 6, and a risk data set was generated for the routes travelled. From then on, these already mapped routes have information on points and risk areas and when they are traveled again, the tractor that carries them must be equipped with a display equipment 7; in addition, the user can remotely indicate the data of the type of load and percentage of filling in the semi-trailer so that the application running on server 6, can process them and thus modify the parameters of sensor equipment 1.

A summary of significant points determined by the first measurement are shown in Table No. 3.

TABLE NO. 3

| Type of Risk Index | Grade | Position | Date - Time |
|---|---|---|---|
| Roll-over | 0.59551 | −36.7933-73.0693 | 27 Nov. 2014 16:50:13 |
| Thrust | 0.781 | −36.7933-73.0693 | 27 Nov. 2014 16:50:18 |
| Roll-over | 0.63483 | −36.7814-73.0205 | 27 Nov. 2014 16:59:50 |
| Roll-over | 0.68258 | −36.7303-72.8599 | 27 Nov. 2014 17:15:05 |
| Braking | 0.79798 | −36.7323-72.8010 | 27 Nov. 2014 17:19:41 |
| Roll-over | 0.59551 | −36.7933-73.0696 | 27 Nov. 2014 17:23:44 |
| Roll-over | 0.59551 | −36.7083-72.7176 | 27 Nov. 2014 17:25:50 |
| Roll-over | 0.9073 | −36.6482-72.2205 | 27 Nov. 2014 18:03:24 |
| Thrust | 0.455 | −36.5218-72.0609 | 27 Nov. 2014 18:19:01 |
| Thrust | 0.464 | −36.1306-71.8064 | 27 Nov. 2014 19:41:25 |
| Braking | 0.34343 | −36.0064-71.7293 | 27 Nov. 2014 19:53:24 |
| Roll-over | 0.59551 | −35.9858-71.7071 | 27 Nov. 2014 19:55:34 |
| Roll-over | 0.92697 | −35.8596-71.6297 | 27 Nov. 2014 20:06:50 |
| Thrust | 0.635 | −35.5739-71.7012 | 27 Nov. 2014 20:30:23 |
| Braking | 0.54545 | −35.5449-71.6951 | 27 Nov. 2014 20:32:47 |
| Roll-over | 0.58427 | −35.4112-71.6287 | 27 Nov. 2014 20:44:25 |
| Braking | 0.34343 | −35.3886-71.6092 | 27 Nov. 2014 20:46:39 |

TABLE NO. 3-continued

| Type of Risk Index | Grade | Position | Date - Time |
|---|---|---|---|
| Roll-over | 0.57584 | −35.3441-71.5695 | 27 Nov. 2014 20:51:12 |
| Braking | 0.41414 | −35.3441-71.5695 | 27 Nov. 2014 20:51:12 |
| Roll-over | 0.6236 | −35.3254-71.5459 | 27 Nov. 2014 20:53:19 |

The invention claimed is:

1. A dynamic-physical condition monitoring system of a land freight transport having a driver's cab, wherein the monitoring system allows anticipating risk conditions during travel of the freight transport, CHARACTERIZED in that the monitoring system includes at least:
   a) sensor equipment which is attached to a container for transported cargo, wherein the sensor equipment measures and registers, during its travel displacement, information defined as a path, tri-dimensional acceleration, tri-dimensional orientation, velocity and geo-referenced position of the transported cargo;
   b) a microcontroller of the sensor equipment, programmed with firmware that processes data from: geo-referenced position, tri-dimensional acceleration, tri-dimensional orientation, speed, weight, gravity centre position and cargo container dimensions, the microcontroller being configured to create datasets from said processing and to generate risk alarms during travel of the container;
   c) a memory module, of the sensing equipment, which stores the information collected during the travel for each of one or more combinations of route, transported cargo and cargo container;
   d) display equipment located in the driver's cab, wherein the display equipment receives via a remote server data from the sensor equipment during or prior to travel, and displays one or both of audible and visual alarms;
   e) a memory module installed in the display equipment, wherein the memory module stores information on geo-referenced risk points and areas associated with each of the one or more combinations of route, transported cargo and cargo container;
   f) the remote server is configured to have software, wherein the remote server receives, stores and processes the information obtained from the sensor equipment and to transmit the information to the display equipment from specific geo-referenced points and risk areas for each of the one or more combinations of route, transported cargo and cargo container;
   g) a wireless communication channel configured to operate between the sensor equipment and the display equipment during travel of the transported cargo; and
   h) communication means configured to operate among the sensor equipment, the display equipment and the remote server via a cellular network;
   wherein the monitoring system allows georeferenced information to be obtained from risk areas and points of risk during a journey between starting and ending points including, but not limited to: instability, lateral overturning risk, lateral slippage risk, excessive or prolonged braking, excessive frontal acceleration, vibrations over a certain threshold, and exceeding of a maximum road speed determined for each of the combinations of route, transported cargo and cargo container combination.

2. The monitoring system, according to claim 1, CHARACTERIZED in that the sensor equipment in the container comprises at least: a tri-dimensional accelerometer, a tri-dimensional gyroscope, a GPS module, a GPRS module, a memory module, a power supply, a microcontroller and a radio transceiver.

3. The monitoring system, according to claim 1, CHARACTERIZED in that the sensor equipment can generate and transmit alarm information to the display equipment by means of a radio link or to a remote server through a cellular network.

4. The monitoring system, according to claim 1, CHARACTERIZED in that the information extracted from the sensor equipment is processed on the remote server with a specific software, generates a set of points and/or risk areas including, but not limited to, lateral overturning, lateral slippage, advance braking, dangerous frontal traction, force on different points of the cargo container, all geo-referenced and associated with a particular route, cargo and cargo container combination.

5. The monitoring system, according to claim 1, configured to generate the risk alarms as audible or visual alarms, CHARACTERIZED in that if no audible or visual risk alarms are generated, the sensor equipment attached to the container generates information that will be used to generate preventive alarms in subsequent journeys between the same starting and ending route points and the same combination of transported cargo and containers as a prior journey.

6. The monitoring system, according to claim 1, CHARACTERIZED in that the display equipment includes at least one of a sound horn, a radio transceiver, a microcontroller, a memory, a power supply, a GPS module, an alphanumeric display, a light indicator and fixing means.

7. The monitoring system, according to claim 1, CHARACTERIZED in that prior to travel, the display equipment receives and processes from the remote server data from: cargo, cargo container, origin and georeferenced destinations, which will later generate alarms based on previous measurements for the same combination of route, transported cargo and cargo container.

8. The monitoring system, according to claim 1, CHARACTERIZED in that firmware of the microcontroller of the sensor equipment receives either from the remote server or from a computer connected to the remote server, processed data in the remote server that it is used to generate preventive risk alarms, for each cargo combination, cargo container type and determined route.

9. The monitoring system, according to claim 1, CHARACTERIZED in that the sensor equipment generates information of points and risk areas that feeds a database stored in the remote server that contains each combination of, but not limited to, route, load, cargo container, time and date previously registered and that is updated with the information of each of subsequent trips.

10. The monitoring system, according to claim 1, CHARACTERIZED in that the information for each of the one or more combinations of route, transported cargo and cargo container stored in the sensor equipment, discloses and reproduces in whole or in part a physical trajectory of the transported cargo.

11. The monitoring system, according to claim 1, CHARACTERIZED in that it incorporates cargo and container cargo data such as, but not limited to: license plate, tare, capacity, dimensions, container type, cargo type, cargo layout and filling percentage.

12. The monitoring system, according to claim 1, CHARACTERIZED in that the characteristics of the transported cargo, cargo container and its displacement are fed into the remote server, such as, but not limited to: origin, destination, weight, density, type of cargo, center of gravity, date and time.

13. The monitoring system, according to claim 1, CHARACTERIZED in that during a first measurement and recording on a predetermined route, load and cargo container combination, carried out with the sensor equipment as defined in paragraph a) of claim 1, generates data that is subsequently extracted and processed on the remote server to generate information from georeferenced points and risk areas of, but not limited to, instability during a journey.

14. The monitoring system, according to claim 1, CHARACTERIZED in that for each previously stored record of tri-dimensional acceleration, orientation, georeferenced position and velocity of the transported cargo over a predetermined combination of route, load and cargo container, the sensor equipment again generates data that is later extracted and processed in the remote server to generate complementary information on georeferenced points and risk areas.

15. The monitoring system, according to claim 1, CHARACTERIZED in that the geo-referenced point and risk area information associated with each combination of path, load and container of the load previously generated in the remote server, is stored and sent to the display equipment so that it can be processed and used when the same combination of load and container is moved again along the same route, thereby generating preventive risk alarms based on the measurements as defined in paragraph a) of claim 1.

16. The monitoring system, according to claim 1, CHARACTERIZED in that the display equipment through the microcontroller firmware, selects and uses during each displacements, a specific data set corresponding to that route and thus operates with the capacity to generate the aforementioned specific risk alarms associated with each specific cargo and cargo container combination.

17. The monitoring system, according to claim 1, CHARACTERIZED in that when the display equipment, prior to starting a current route which corresponds at least in part to a prior route, receives and/or contains previously processed information on the remote server about points and/or risk areas of the prior route, and that the prior route or part of it corresponds to the current route, load and cargo container, the display equipment can operate with an ability to generate anticipatory risk alarms previously mentioned during the prior route even if no sensor equipment it is installed in the cargo container.

18. The monitoring system, according to claim 1, CHARACTERIZED in that when the fed origin and destination data are already registered but if any of the data of: weight or percentage of fill or load type are different from those already registered for the same route, the server software processes this information and generates a new set of data points and/or risk areas for the same route; thus, the same origin-destination-container-load dataset may have several and specific sets of risk points and areas different from each other.

19. The monitoring system, according to claim 1, CHARACTERIZED in that the sensor equipment through the microcontroller firmware, receives and stores all the datasets processed pursuant to paragraph b) of claim 1 in the remote server for different routes and selects and uses them to generate the specific alarms for each route, weight values, filling percentage and load type combination.

20. The monitoring system, according to claim 1, CHARACTERIZED that the information extracted from the sensor equipment is processed in the remote server, generating new risk points and is sent back to the sensor equipment for use in future displacements that coincide with both georeferenced origin and destination.

\* \* \* \* \*